United States Patent [19]
Barzynski et al.

[11] B 3,926,636
[45] Dec. 16, 1975

[54] PHOTOCURABLE COMPOSITIONS

[75] Inventors: Helmut Barzynski; Matthias Marx, both of Bad Durkheim; Gerhard Storck, Ruchheim; Dietrich Saenger, Ludwigshafen, all of Germany

[73] Assignee: Badische Anilin- & Soda-Fabrik Aktiengesellschaft, Ludwigshafen (Rhine), Germany

[22] Filed: Aug. 28, 1973

[21] Appl. No.: 392,242

[44] Published under the Trial Voluntary Protest Program on January 28, 1975 as document no. B 392,242.

[30] Foreign Application Priority Data
Aug. 29, 1972  Germany............................ 2242394

[52] U.S. Cl.................. 96/115 R; 96/33; 96/35.1; 96/36.3; 156/272; 204/159.14; 427/54
[51] Int. Cl.²............................................ G03C 1/70
[58] Field of Search....................... 96/115 R, 35.1; 204/159.14; 117/93.31; 156/272

[56] References Cited
UNITED STATES PATENTS
3,615,629  10/1971  Wilhelm et al.................... 96/115 R

OTHER PUBLICATIONS
Patchornik, J. A. et al., J. Amer. Chem. Soc., 92, 6333, 1970.

*Primary Examiner*—Ronald H. Smith
*Attorney, Agent, or Firm*—Johnston, Keil, Thompson & Shurtleff

[57] ABSTRACT

A light-curable composition consisting of: (A) a substance containing at least two aromatic or heteroaromatic o-nitrocarbinol ester groups of the general formula:

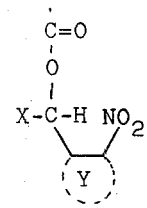

in which Y is an aromatic or heteroaromatic ring system and X is hydrogen or alkyl, aryl alkaryl or aralkyl; and (B) a compound having et laest two aziridine groups or isocyanate groups in the molecule. The photocurable composition of the invention is particularly suitable for the production of coatings and printing plates.

12 Claims, No Drawings

PHOTOCURABLE COMPOSITIONS

The present invention relates to photocurable mixtures of compounds containing o-nitrocarbinol ester groupings and compounds containing aziridine groups or isocyanate groups.

It is known that substances which contain unsaturated groups can be polymerized and cured under the action of light. Polymerization or curing by this method is only carried out in special cases because the space-time yield of photochemically initiated polymerizations is generally far less than for example in the case of peroxidic initiation. It is thus necessary to accelerate the polymerization by adding sensitizers. Another disadvantage of photochemical initiation is that the materials being polymerized are curable only on the surface because the light is strongly absorbed by the added sensitizer even when there is little depth to the layer. Moreover these systems usually only give a tackfree cured product when access of atmospheric oxygen is prevented by passing an inert gas thereover or trapping the atmospheric oxygen by autoxidizable compounds.

It is an object of the present invention is to avoid the said disadvantages of conventional photochemically curable compositions and to prepare tackfree coatings and shaped articles in a thicker layer without the need for blanketing.

In accordance with the present invention a photocurable composition consists of

A. at least one substance which contains at least two aromatic or heteroaromatic o-nitrocarbinol ester groupings of the formula

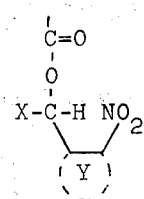

where Y is an aromatic or herteroaromatic ring system of five to 14 ring members and X is hydrogen or alkyl of one to eight carbon atoms or unsubstituted or substituted aryl or aralkyl of up to 12 carbon atoms;

B. at least one compound containing at least two aziridine groupings or isocyanate groupings in the molecule; and also optionally C. one or more conventional natural or synthetic binders, fillers, reinforcing materials, pigments, sensitizers, plasticizers and/or other auxiliaries conventionally used in the coating agents industry.

Compositions according to the invention whose component (A) contains two o-nitrobenzyl alcohol ester groupings or 2-nitro-6-chlorobenzyl alcohol ester groupings combined therein are particularly advantageous.

The compositions of the invention, even in the presence of air, give tackfree coatings and shaped articles having valuable properties even in thick layers and are distinguised by easy processing.

Details concerning the components which make up the compositions of the invention will now be given:

A. Both low and high molecular weight substances are suitable for component (A). It contains at least two o-nitrocarbinol ester groupings of the formula:

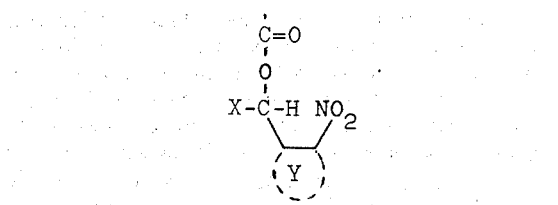

combined in each molecule; Y is an aromatic or heteroaromatic ring system of five to 14 ring members and X is hydrogen or alkyl of one to eight carbon atoms or unsubstituted or substituted aryl or aralkyl of up to 12 carbon atoms.

Examples of suitable aromatic and heteroaromatic ring systems Y with o-nitrocarbinol ester groupings are: mononuclear and polynuclear aromatic rings as for example of benzene, naphthalene, anthracene, phenanthrene, indene, acenaphthene and anthraquinone which may contain other substituents as for example one or more linear or branched alkyl radical containing one to eight carbon atoms or alkoxy radicals containing one to six carbon atoms or halo, nitro, amino, monomethylamino, dimethylamino or sulfonic groups. Pyridine and appropriately substituted pyridine are suitable as heteroaromatic ring systems.

Preferred ring systems Y are those of benzene and substituted benzenes.

Examples of aromatic or heteroaromatic o-nitrocarbinols on which the nitrocarbinol esters are based which are particularly suitable include those having the following groupings: o-nitrobenzyl, 6-nitroveratryl, 2-nitroveratryl, 2-nitro-4-aminobenzyl, 2-nitro-4-dimethylaminobenzyl, 2-nitro-4-methylaminobenzyl, 2-nitro-5-dimethylaminobenzyl, 2-nitro-5-aminobenzyl, 2-nitro-4,6-dimethoxybenzyl, 2,4-dinitrobenzyl, 3-methyl-2,4-dinitrobenzyl, 2-nitro-4-methylbenzyl, 2,4,6-trinitrobenzyl, 2-nitro-6-chlorobenzyl, 2-nitrobenzohydrol, 2,2-dinitrobenzohydrol, 2,4-dinitrobenzohydrol and 2,2',4,4'-tetranitrobenzohydrol. Other suitable compounds are 2-nitro-3-hydroxymethylnaphthalene, 1-nitro-2-hydroxymethylnaphthalene, 1-nitro-2-hydroxymethylanthraquinone and 2-nitro-3-hydroxymethylpyridine. Carbinols which are particularly suitable include o-nitrobenzyl alcohol, 6-chloro-2-nitrobenzyl alcohol and 6-nitroverartyl alcohol.

Various routes are available for the production of the o-nitrocarbinol esters in question, for example direct esterification of the carbinol with the appropriate acid. The aromatic o-nitrocarbinol groups may also be introduced by conventional transesterification methods. Synthesis by reaction of an alkali metal salt of the acid with o-nitrocarbinol halide in aqueous suspension is also successful. In an advantageous embodiment of the esterification reaction the anhydride of an acid having a pH of 2.5 or less is reacted with the o-nitrocarbinol in a solvent. According to a particularly preferred embodiment the o-nitrocarbinol ester is prepared by reaction of the acid chloride with the o-nitrocarbinol in the presence of a base in a nonpolar solvent.

Suitable acids or esterifiable derivatives thereof with which the o-nitrocarbinols may be combined as esters include in addition to inorganic acids as for example phosphoric acid, boric acid or polymerized substances containing inorganic acid groups as for example copolymers of vinylsulfonic acid or vinylphosphonic acid, also compounds which contain per molecule at least two groups suitable for esterification such as carboxylic, carboxylic anhydride, carboxylic chloride groups and carboxylic ester groups suitable for transesterification as for example methyl or ethyl esters.

Polycondensates, polymers and adducts which contain groups suitable for esterification by the o-nitrocarbinols are also suitable as for example saturated and unsaturated polyesters containing free carboxyl groups, polymers and copolymers of based on acrylates, methacrylates, vinyl esters, styrene or olefins which contain polymerizable acrylic acid, methacrylic acid, itaconic acid, maleic anhydride, acrylyl chloride and like esterifiable groups, and also maleic anhydride adducts. Polymers which contain polymerized units of an o-nitrocarbinol ester, preferably the o-nitrobenzyl or 2-nitro-6-chlorobenzyl ester of acrylic acid or methacrylic acid are particularly advantageous as components (A).

The content in the high molecular weight substances of aromatic or heteroaromatic o-nitrocarbinol groupings may vary within wide limits; they should contain however at least two aromatic or heteroaromatic o-nitrocarbinol groups per molecule.

B. Compound containing at least two aziridine groups or isocyanate groups are suitable as components (B).

Suitable aziridine compounds are low molecular weight and polymerized compounds which contain per molecule at least two aziridine groups of the general formula:

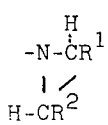

in which $R^1$ and $R^2$ may be identical or different and each is hydrogen or linear or branched alkyl of one to four carbon atoms.

Suitable aziridine compounds are as follows:
1. Compounds of the general formula:

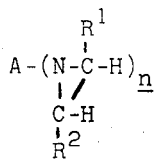

in which $n$ is 2 or 3, $R^1$ and $R^2$ have the above meanings and A is alkyl, aryl, aralkyl or a cycloaliphatic or heterocyclic radical whose valence is equal to $n$ as for example:

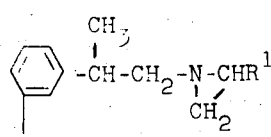

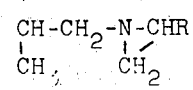

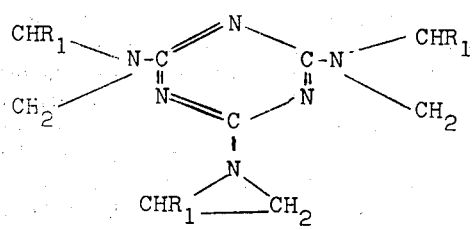

$R^1$ in each case being methyl or preferably hydrogen;
2. compounds of the general formula:

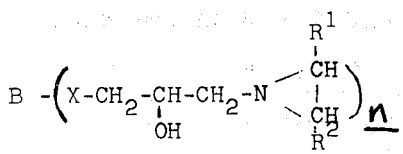

where $R^1$ and $R^2$ have the meanings given above, $n$ is one of the integers from 1 to 6, B is alkyl, aryl, aralkyl or a cycloaliphatic or heterocyclic radical or a polyalkylene glycol ether group with one to fifty units and X is oxygen, sulfur, or nitrogen or may be missing, as for example

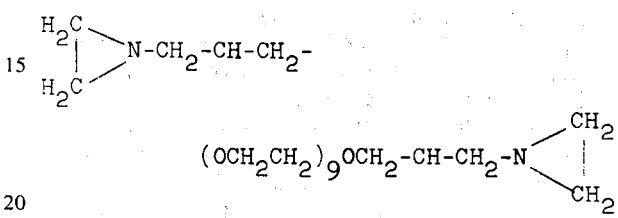

3. compounds of the general formula:

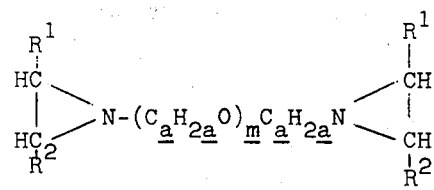

where $R^1$ and $R^2$ have the above meanings, $a$ is 2, 3 or 4, $m$ is one of the integers from 1 to 50, as for example

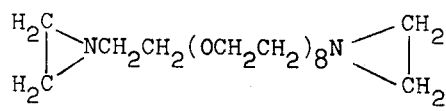

4. compounds of the general formula:

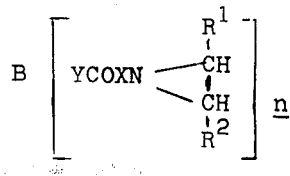

where $R^1$ and $R^2$ have the above meanings, $n$ is one of the integers 2 to 6, X is a linear or any branched alkylene of two to six carbon atoms, B is alkyl, aryl, aralkyl or a cycloaliphatic or heterocyclic radical or a polyalkylene glycol ether group with one to 50 units and Y is oxygen, sulfur, nitrogen or NH, as for example:

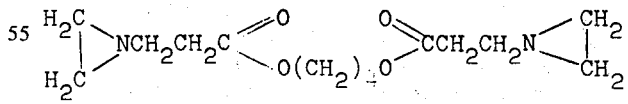

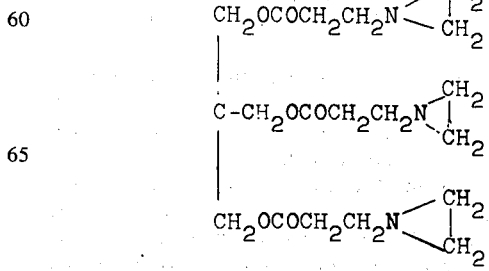

5. compounds of the general formula:

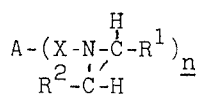

where $R^1$ and $R^2$ have the above meanings, $n$ is one of the integers from 2 to 6, X is one of the groupings: —NHCO—, —CO—, or —O—CO— and A is alkyl aryl, aralkyl or a cycloaliphatic or heterocyclic radical whose valence equals $n$, for example:

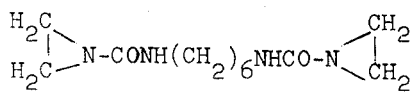

6. compounds of the general formula:

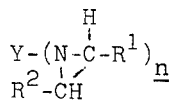

where $R^1$ and $R^2$ have the above meanings, Y is a divalent —CO—, —SO$_2$— or —SO— radical or a high valence boron, P=S or P=O radical and $n$ accordingly is 2 or 3, as for example:

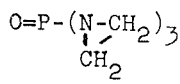

Mixtures of the said aziridinyl compounds and polymers and polycondensates with aziridinyl groups are similarly suitable.

As already mentioned above the formula of the grouping:

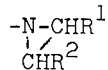

includes substituted and unsubstituted aziridines.

Examples of suitable aziridines of this type are also described in U.S. Pat. Nos. 3,157,607, 3,171,826, 3,182,040, 3,198,770, 3,295,916, 3,316,210, 3,337,533, 3,378,535, 3,393,184, 3,507,837, 3,549,378, 3,507,839, 2,596,200 and 3,197,463;
DOS 1,494,290 and 1,444,275;
DAS 1,270,389, 1,209,097 and 1,470,321;
in German Pat. Nos. 880,740 and 872,037;
In French Pat. No. 1,427,431;
in Belgian Pat. Nos. 708,173, 702,436, 650,991 and 616,325; and
British Pat. Nos. 1,054,635 and 1,003,385.

Suitable compounds having at least two isocyanate groups in the molecule include conventional polyisocyanates having two or more isocyanate groups in the molecule, for example alkyl and cycloalkyl diisocyanates preferably of four to 41 carbon atoms in the alkyl as for example dimer acid diisocyanate, isophorone diisocyanate, dicyclohexylmethane diisocyanate, 1,4-butane diisocyanate, hexamethylene diisocyanate, heptadecane diisocyanate, 2,2,4-trimethylhexamethylene diisocyanate, 2,6-diisocyanatomethyl caproate (Lysine diisocyanate methyl ester), isocyanurate isocyanates, for example the product of the reaction of 2,4-toluylene diisocyanate with hexamethylene diisocyanate, biurets such as hexamethylene diisocyanate biuret, aryl diisocyanates and aryl triisocyanates, as for example toluylene diisocyanate, diphenylmethane diisocyanate, naphthylene diisocyanate, triphenylmethane triisocyanate, xylylene diisocyanate, mixed aliphatic-aromatic diisocyanates and triisocyanates, as for example isocyanurate isocyanates from the reaction of 2,4-toluylene diisocyanate and hexamethylene diisocyanate, and diisocyanates and triisocyanates containing other functional groups, as for example carbonyl isocyanates such as carbonyl diisocyanate, OCN-CO-NCO or isophthaloyl diisocyanate:

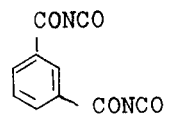

sulfaryl isocyanates, sulfonyl diisocyanate, OCH—SO$_2$—NCO, or m-phenylenedisulfonyl diisocyanate, isocyanurate isocyanates as for examples the reaction product of 2,4-toluylene diisocyanate and hexamethylene diisocyanate, allophanate isocyanates and triisocyanates containing heteroatoms, as for example the reaction product of hexamethylcyclotrisilazane and diphenylmethane diisocyanate, and polymers containing isocyanate groups, for example copolymers of vinyl isocyanate, and polymers or polycondensates containing hydroxyl groups and/or amine groups which have been reacted with an excess of diisocyanate or triisocyanate.

The isocyanate components do not need to be blocked because the compositions of the invention are only brought into a reactive condition upon exposure to light. During the curing stop there is therefore no formation of toxic or malodorous substances from protective groups, as for example phenols, which as a rule make it necessary for operations to be carried out in special rooms with suction means. Blocked isocyanates may however be used as component (B) in the photocurable compositions of the invention.

It is preferred to use carbonyl isocyanates and/or sulfonyl isocyanates, as for example m-phenylenedisulfonyl diisocyanate or isophthaloyl diisocyanate, as component (B) for compositions containing isocyanate groups which are to cure particularly rapidly when exposed to light.

Plastics which contain isocyanates and which are curable by the action of light of the type according to the invention have the advantage of being particularly widely modifiable in reactivity; the said acyl isocyanates react most rapidly, followed by aromatic and finally aliphatic isocyanates, cycloaliphatic secondary isocyanates cycloaliphatic secondary isocyanates reacting more slowly than linear aliphatic primary isocyanates. Naturally the reaction rate after exposure to light may be increased by known catalysts or differences in reactivity can be compensated for by dosing with catalyst. The reactivity can also be influenced, although within fairly narrow limits, by way of the constitution of the aziridine derivatives in the case of compositions containing the abovementioned aziridine derivatives as component (B). For example N,N-ethylenureas are more reactive than ethyleniminoalkyl compounds. The aziridine plastics have the advantage over materials containing an isocyanate that they are inert to atmospheric moisture, to water, to aqueous solvents and alcoholic solvents under conventional processing conditions. This is of practical importance when the plastics are to be processed from solution or are to be applied for example as a coating to a moist substrate.

The ratio of component (A) to component (B) is conveniently chosen so that the aziridine and isocyanate groups are present in about the same molar amounts as the nitrocarbinol ester groups. They may however be present in an amount up to 20% molar above or below the same. The molecular weight of the crosslinking density of the polymers forming may be affected in this way.

(C) The component (C) to be used optionally mixed with components (A) and (B) may be a natural or synthetic binder, as for example a cellulose derivative such as nitrocellulose or a cellulose ester, for example cellulose acetate or cellulose butyrate, or a mixed ester such as a cellulose acetobutyrate, a cellulose ether, a natural or synthetic rubber of a derivative thereof, a natural resin or modified product thereof such as rosin and chemically modified rosin, as for example Diels-Alder adducts with maleic anhydride, other resisn of vegetable or animal origin and their derivatives such as shellac, natural oils, linear or branches polyesters, allyl resins, vinyl resins, addition resins, for example polyurethanes, epoxides, epoxide resins, silicones and silicone resins, ketone resins, aldehyde resins, urea resins, melamine resins, formaldehyde resins and phenol resins, conventional reinforcing materials, as for example glass fibers, glass beads, synthetic fibers, fabric of various materials, powdered reinforcing materials and/or pigments. Usually only in smaller amounts of up to 10% by weight based on the mixture of (A) and (B): conventional inorganic and/or organic pigments having a refractive index of more than 1.8, as for example rutile, anatase, iron oxides; Fillers having refractive indexes less than 1.8, preferably less than 1.5 may be present in higher, proportions, for example glass powder or glass spheres, powdered quartz, borax, calcite, crystobalite and talc and conventional plasticizers, as for example phthalates, for example dioctyl phathalate, adipates such as isononyl adipate or polymer plasticizers and the like. There may also be presnt soluble dyes to give transparent color or to correct color, for example soluble blue dyes for brightening in the case of brown or yellow discoloration.

Photocurable compositions according to the invention may if desired also have sensitizers added to them which improve sensitivity to light and spectral sensitivity. Examples of such sensitizers are: xanthene dyes such as fluorosceine, eosine and rhodamine S, and triplet sensitizers such as are described for example in the bock by N. J. Turro "Molecular Photochemistry", W. A. Benjamin Inc., New York, 1967, on page 132.

Photocuring may also be accelerated by fluorescent compounds and thus adequate light intensity can be effective in deep layers, especially in the case of pigmented compositions.

The photocurable compositions of the invention may be used for the production of moldings, impregnations, bonds, coatings, printing inks, print pastes and the like.

They are also suitable for the production of printing plates for example by exposing a plate coated with the mixture to light and then washing away the unexposed areas with a solvent. The exposed zones then remain as a relief. This method is suitable for the production of letterpress and offset printing plates.

Suitable light sources for curing compositions according to the invention are those which emit within the wavelength range from 200 to 500 nm, i.e., argon arc lamps, mercury vapor lamps, xenon high pressure lamps, and mercury low pressure fluorescent lamps. Curing with mercury low pressure fluorescent lamps which have their emission maximum at from 350 to 370 nm is particularly advantageous. Curing time depends on the wavelength and intensity of the radiation and is generally from less than 1 minute to a few minutes.

Hardening after exposure in the dark takes place in a few minutes to a few hours depending on the reactivity and concentration of the added aziridine or isocyanate.

The compositions of the invention are used in the form of solutions for application in a thin layer, for example as a coating. Conventional organic solvents are generally used, as for example alcohols, esters, aromatics or mixtures of such solvents. When a sufficiently hydrophilic aromatic or heteroaromatic o-nitrocarbinol ester is used as component (A) and a compound having at least two aziridine groups is used as component (B) application may be made from aqueous solution or dispersion. In the case of these systems there is no pollution of the atmosphere by evaporation of organic solvents such as in the case with conventional coating materials.

The following Examples illustrate the invention. Parts and percentages specified in the Examples are by weight.

EXAMPLE 1

1.0 part of trimethylolpropane-tris-β-(N-ethyleniminopropionic acid ester

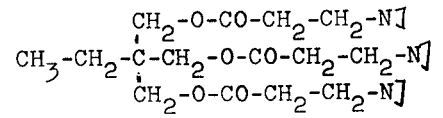

is added to 10 parts of a 50% solution of a copolymer from 15 parts of o-nitrobenzyl acrylate, 15 parts of 2-ethylhexyl acrylate and 70 parts of methyl methacrylate. This mixture is stable in storage if light is excluded. To produce a crosslinked coating the mixture is applied with a coating knife to a degreased unbonderized automotive body steel as a film having 50 microns wet film thickness, dried in the air and irradaited for two minutes under a mercury high pressure vapor lamp, half of the film being covered with a light-impermeable film.

The exposed portion of the film is insoluble in esters, ketones, alcohols and aromatic solvents whereas the unexposed film does not adhere and splits off from the substrate when it is deformed. Test of bond strength: the coating is provided with crosshatching according to DIN 53,151 and over this a TESA$^{(R)}$ film is stuck and torn off upwardly with a jerk.

The irradiated portion of the film is tackfree while the unexposed portion is not.

EXAMPLE 2

A homogenous mixture of 100 parts of a copolymer of 10% of o-nitrobenzyl acrylate, 25% of 2-ethylhexyl acrylate and 65% of methyl methacrylate, 50 parts of quartz powder, 0.1 part of methylene blue, 5 parts of isophorone diisocyanate, 50 parts of butyl acetate and 50 parts of toluene is cast on chip board with a casting machine. The solvent is removed in a drying tunnel. The chipboard is then passed through under the light from a nercury low pressure fluorescent lamp (emission maximum at 360 nm) at a rate of 0.5 meter per minute. A coating is obtained which is not soluble in conventional coating agents solvents, whic is hard and which is weatherproof.

EXAMPLE 3

A homogenous coating mixture is prepared from 10 parts of a 60% solution in ethyl gylcol acetate of a polyester having 2-nitro-3,4-dimethoxybenzyl ester groups and 1.2 parts of 4,4'-diethylenurea-3,3'-dimethyldicyclohexyl-2,2-propane:

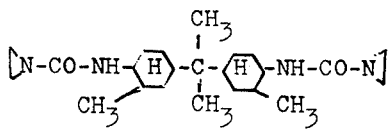

The dissolved polyester is built up from isophthalic acid, adipic acid, neopentyl glycol and trimethylolpropane and contains 10.5% by weight of 2-nitro-3,4-dimethoxybenzyl ester groups. The mixture is knife coated onto a metallic substrate and after drying leaves a layer having a thickness of 125 microns. A mask is applied and through this the layer is exposed to light from a mercury high pressure lamp for 3 minutes and then washed with acetone. The image formed by the lightpermeable zones of mask remains as a yellowish brown raised image and can be used as a block for bock printing.

A printing plate prepared in an analogous manner with a layer having a thickness of 5 microns may be used for offset printing.

We claim:

1. A composition curable under the action of light which consists of:
    A. at least one substance containing at least two aromatic or heteroaromatic o-nitrocarbinol ester groups of the general formula:

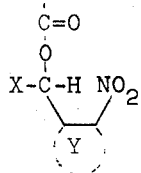

in which Y is an aromatic or pyridine ring system of five to 14 ring members and X is hydrogen or alkyl of one to eight carbon atoms or an aryl or aralkyl of up to 12 carbon atoms; and
    B. at least one compound with at least two aziridine groups or isocyanate groups in the molecule.

2. A composition as claimed in claim 1 which also contains a substance from the group consisting of conventional natural and synthetic binders, fillers, reinforcement materials, pigments, sensitizers and plasticizers.

3. A photocurable composition as claimed in claim 1 wherein component (A) contains at least two o-nitrobenzyl alcohol ester groups or 2-nitro-6-chlorobenzyl alcohol ester groups.

4. A photocurable composition as claimed in claim 1 wherein component (A) is a polymer containing polymerized units of an o-nitrocarbinol ester of acrylic acid or methacrylic acid.

5. A photocurable composition as claimed in claim 1 wherein component (A) is a polymer containing polymerized units of o-nitrobenzyl acrylate, o-nitrobenzyl methacrylate, 2-nitro-6-chlorobenzyl acrylate or 2-nitro-6-chlorobenzyl methacrylate.

6. A photocurable composition as claimed in claim 1 wherein component (A) is combined with component (B) in such a ratio that the aziridine groups and nitrocarbinol ester groups are present in about equimolar amounts.

7. A photocurable composition as claimed in claim 1 wherein component (A) is combined with component (B) in such a ratio that the isocyanate groups and nitrocarbinol ester groups are present in about equimolar amounts.

8. A photocurable composition as claimed in claim 1 which additionally contains a conventional organic solvent.

9. A process for the production of moldings, impregnations, bonds, coatings, printing inks and printing plates which comprises exposing to light of a wavelength of from 200 to 500 nm a composition as claimed in claim 1.

10. A process for the production of moldings, impregnations, bonds, coatings, printing inks and printing plates which comprises exposing to light of a wavelength of from 200 to 500 nm a photocurable composition as claimed in claim 2.

11. A molding, impregnation, bond, coating, printing ink or printing plate prepared using a photocurable composition as claimed in claim 1.

12. A molding, impregnation, bond, coating, printing ink or printing plate prepared using a photocurable composition as claimed in claim 2.

* * * * *